United States Patent
Smith, IV et al.

(10) Patent No.: US 7,716,382 B2
(45) Date of Patent: May 11, 2010

(54) RICH TARGETING CRITERIA FOR SELECTION OF DRIVER PACKAGES

(75) Inventors: Frederick J. Smith, IV, Redmond, WA (US); Eugene S. Lin, Seattle, WA (US); Jason T Cobb, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 933 days.

(21) Appl. No.: 11/032,948

(22) Filed: Jan. 11, 2005

(65) Prior Publication Data

US 2006/0168372 A1 Jul. 27, 2006

(51) Int. Cl.
*G06F 3/00* (2006.01)
*G06F 13/12* (2006.01)

(52) U.S. Cl. .............................. 710/8; 710/15; 710/62; 710/72; 719/321

(58) Field of Classification Search ....................... None
See application file for complete search history.

(56) References Cited

U.S. PATENT DOCUMENTS

| | | | | |
|---|---|---|---|---|
| 5,630,076 A | * | 5/1997 | Saulpaugh et al. | 710/104 |
| 2003/0196007 A1 | * | 10/2003 | Baron | 710/13 |
| 2004/0073912 A1 | * | 4/2004 | Meza | 719/321 |
| 2005/0028172 A1 | * | 2/2005 | Yoshikawa et al. | 719/321 |
| 2005/0177829 A1 | * | 8/2005 | Vishwanath | 717/177 |
| 2005/0198650 A1 | * | 9/2005 | Ford et al. | 719/321 |

* cited by examiner

*Primary Examiner*—Alan Chen
(74) *Attorney, Agent, or Firm*—Wolf, Greenfield & Sacks, P.C.

(57) ABSTRACT

Systems and methods are disclosed that facilitate refining a list of candidate driver packages for a detected plug-and-play device. A device can be detected and a hardware ID there for can be determined and compared to hardware IDs in a data store to determine a preliminary list of driver packages that match the hardware device ID. The driver packages can be tagged with additional rich targeting criteria that must be satisfied in order for the driver package to be retained in the candidate list. If additional criteria in the driver packages are not satisfied, then the driver package can be excised from the candidate list to refine driver package compatibility with a computer to which the device is connected.

20 Claims, 10 Drawing Sheets

RICH TARGETING CRITERIA FOR SELECTION OF DRIVER PACKAGES

TECHNICAL FIELD

This invention is related to computer devices, and more particularly to plug-and-play driver package selection installation.

BACKGROUND OF THE INVENTION

Computers and computer-based devices have become a necessary tool for many applications throughout the world. Typewriters and slide rules have become obsolete in light of keyboards coupled with sophisticated word-processing applications and calculators that include advanced mathematical functions/capabilities. Moreover, computers that were once used solely for analyzing data have, over time, been transformed into multi-functional, multi-purpose machines utilized for contexts ranging from business applications to multi-media entertainment. Costs of such computing mechanisms have also trended downward, rendering personal computers ubiquitous throughout many portions of the world.

As computing devices have continued to develop and their use have become more widespread, peripherals associated with such devices have also become commonplace. For instance, typical computing devices include a plurality of ports into which peripherals can be attached and utilized in connection with the aforementioned computing devices. More particularly, attachable peripherals can include printers, keyboards, portable music/video players and recorders, cameras, video cards, speaker systems, personal digital assistants (PDAs), portable telephones, or any other suitable computer peripheral. These devices can be physically coupled to a computing device by way of ports (e.g., USB ports, printer ports, . . . ), or can be communicatively coupled over a wireless link. This interaction of peripherals with computing devices has rendered such computing devices even more valuable in terms of user efficiency.

Plug-and-play is one exemplary manner of configuring a computer peripheral to operate desirably with a computing device. Plug-and-play typically requires support in both a hardware device (e.g., a peripheral) coupled to a computing device and in software associated with such device. Hardware devices are typically associated with an identification number or sequence that uniquely identifies the type of hardware device. For instance, a sequence of bits, a name, a serial number, or the like can be employed to uniquely identify the type of hardware device. A computer bus driver then recognizes that a particular type of hardware device has been coupled to the computing device and transmits the device ID to a plug-and-play manager that locates a software driver for the device for installation. The appropriate device driver is then loaded into an operating system of the computing device to enable utilization of the hardware that is desirably being utilized.

This approach of determining a unique identification, however, is associated with various deficiencies that render plug-and-play less than optimal for several hardware devices. For instance, a single vendor can manufacture a peripheral that is to operate in conjunction with any suitable computing device. In reality, however, the peripheral may operate differently given different computer manufacturers. For example, the hardware device may operate as desired for one brand of computing device while operating inadequately for another computing device. Due to the simplistic matching mechanism utilized in connection with plug-and-play, however, there is currently no way to provide granular instructions with respect to finding the proper driver to install and load for the device.

Accordingly, there exists a need in the art for systems and/or methodologies for improving operability of plug-and-play devices.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, facilitates refining a list of candidate driver packages for installation in conjunction with a detected peripheral device, such as a plug-and-play device. A peripheral device can be detected and one or more IDs there for can be compared to IDs stored on a host computer, an installation CD, a driver web site, etc., to generate a list of driver package candidates. The candidate list can then be evaluated for the presence of vendor/manufacturer-specified "rich targeting" (RT) criteria. Such criteria can be expressed, for instance, in an information file (e.g., .inf, or INF) associated with each driver package. For example, an RT criterion can be computer manufacturer identity, computer model, BIOS date revision, existing driver identity (e.g., of a previously installed driver or driver package for the same detected peripheral device, . . . ) or any other suitable criterion a vendor desired to specify in the positive or negative to further limit which driver package(s) will be considered for installation and/or installed upon connection of the peripheral device to a host computer. RT criterion can be based on any software queriable property (e.g., object, such as a web-based enterprise management object, . . . ) and detection of such a criterion can trigger a query to determine whether the RT expression is true. If the criterion is satisfied, then the driver package containing the criterion expression can be retained in the candidate list; if not, the driver package can be excised to refine the list. In this manner, the subject invention provides more robust driver package selection criteria for utilization by an operating system when selecting a driver package for installation than is available with conventional plug-and-play systems, while preserving an essential aspect of plug-and-play technology (e.g., mitigating user intervention).

According to a related aspect of the subject invention user override functionality can be provided whereby experienced users can approve/override various refining actions, which can facilitate driver package installation testing, user customization, and the like. Upon a user indication that override is desired, the user can be presented with a warning that overriding a particular action can compromise driver package selection, system operation, etc. Furthermore, such warnings can additionally indicate the severity of the consequences of user override of an action (e.g., via color coding, icons, . . . ). In this manner, the systems and methods herein can facilitate permitting user customization.

In yet another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
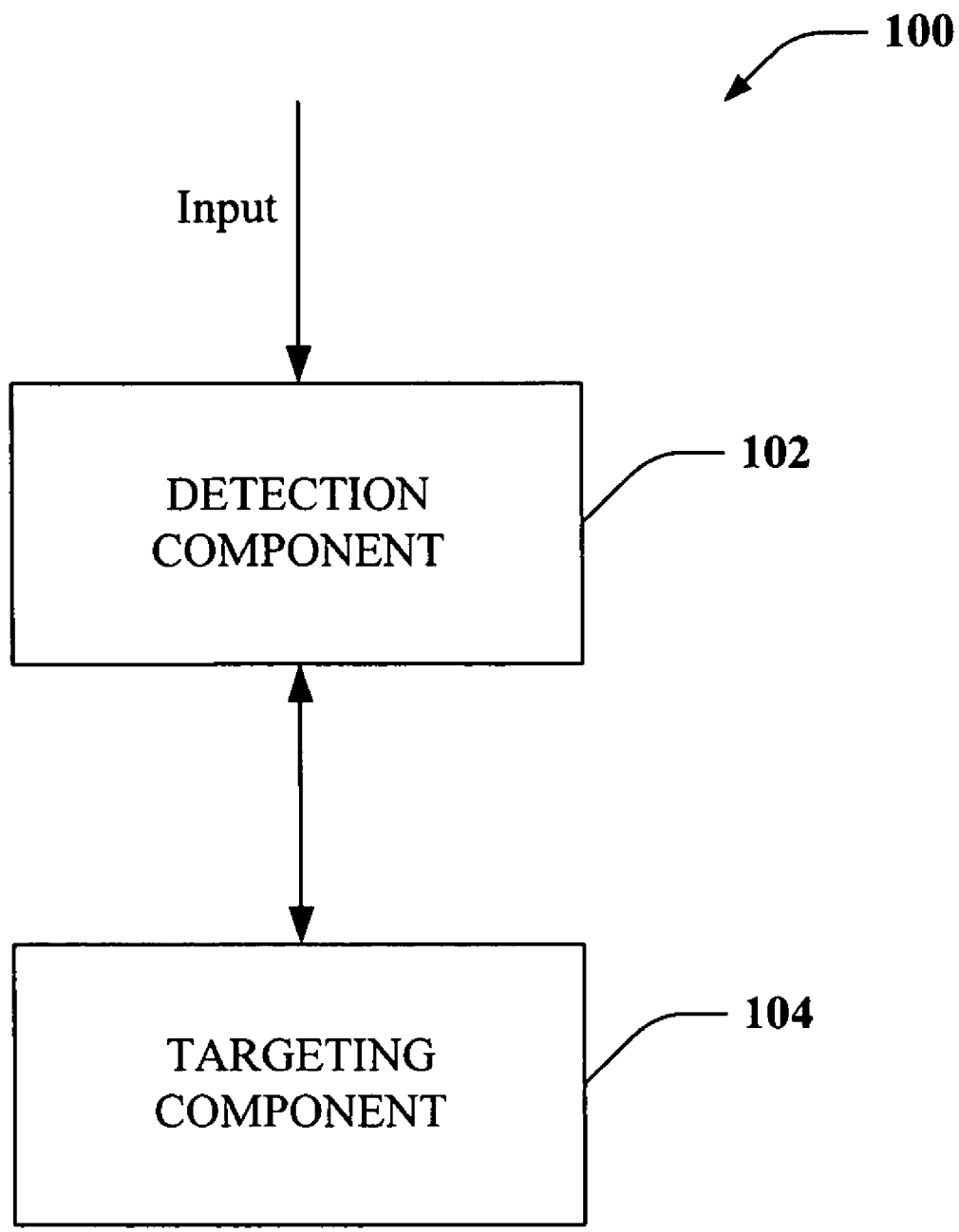
FIG. 1 illustrates a system 100 that facilitates identifying an appropriate device driver package for installation upon detection of a peripheral device in accordance with an aspect of the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring now to FIG. 1, a system 100 is illustrated that facilitates identifying an appropriate driver package for installation upon detection of a peripheral device in accordance with an aspect of the subject invention. The system 100 comprises a detection component 102 that receives input information related to a connection that has been initiated between a previously unconnected device and a computer, such as a PC, a laptop, a PDA, a cellular telephone, and the like. The system 100 further comprises a targeting component 104 that is operatively coupled to the detection component 102. The detection component 102 can reside in the computer as a computer-executable component, application, etc., and can receive information from the peripheral device regarding, for example, the identity of the device (e.g., manufacturer and/or vendor identification, model information, . . . ). Once device IDs have been determined, a list of potential device driver packages can be generated from which an appropriate driver package can be selected and installed to facilitate operation of the device in conjunction with the computer.

The targeting component 104 can receive information from the detection component 102 and can analyze such information to determine a suitable driver package for installation using richer matching criteria than is employed by traditional systems. Conventional systems for "plug-and-play" driver identification and installation compare a hardware ID for the connected device to a hardware ID specified in a driver package (e.g., as determined from a resident list of driver packages on a computer, a CD, an operating system update website, . . . ) to determine compatibility there between. However, this simple matching algorithm can be insufficient in cases where, for example, a particular driver package is designed and branded for a specific original equipment manufacturer (OEM). For instance, if ABC Corporation enlists a vendor to make a PCMCIA card driver package specifically for use with ABC computers, but XYZ Corporation's computers use the same PCMCIA card, then conventional plug-and-play systems will permit the driver package to be installed on an XYZ computer since the hardware ID for the PCMCIA card is compatible with a hardware ID in the driver package. A driver package author can additionally specify computer manufacturer and/or model, along with a BIOS and/or revision/date thereof, cumbersomely requiring a user to confirm that the proper OS is present and to initiate a custom install program, thereby compromising the very essence of "plug-and-play" functionality. In contrast to conventional systems, the system 100 employs richer matching criteria to more stringently assess whether a given driver package is compatible with a connected device in order to preserve plug-and-play functionality (e.g., automatically assessing and installing a connected device without user intervention).

According to an example, a vendor can specify a set of criteria (e.g., beyond simple hardware ID matching) that must be satisfied prior to consideration of a particular driver package as a candidate for installation. A targeting expression can be written into a driver information file (INF) associated with the driver package and can comprise criteria related to tests to be performed on objects (e.g., web-based enterprise management objects associated with the computer, operating system on the computer, . . . ). For instance a vendor can specify that a particular driver package applies only when a specific condition is met (e.g., the computer on which the driver package is to be installed is manufactured by a specified manufacturer, a specified BIOS revision is detected, a specific computer model is detected . . . ).

To further this example, a user can plug in a peripheral device via, for instance, a USB cable, to an ABC computer. The peripheral device can have a rich targeting criterion expressed in the version section of an INF related thereto requiring that only ABC-approved driver packages be installed to run the device. The system 100 can create and execute a query to determine whether the condition that the computer is an ABC computer is true. If the computer is an ABC computer, the targeting component 104 of the system 100 can then assess all candidate driver packages for the hardware device and remove from consideration any driver packages that do not meet the additional rich targeting criteria of "ABC-type computer only." If the query for ABC-approved driver packages returns one or matches, then such matching driver packages remain candidates for installation. Thus, the system 100 facilitates identifying an appropriate driver package for installation based not only the hardware identity, but also on other, more refined criteria, such as computer manufacturer information, OS information, etc., to improve driver package selection.

Moreover, the system 100 can employ multiple targeting criteria statements in combination. For instance, test queries can be run for manufacturer and BIOS version in combination, such that a driver package INF having a matching hardware ID and matching computer manufacturer tag would only be approved if it also contained a matching bios version tag. It is to be appreciated that any suitable WBEM object can be employed when generating a rich targeting expression.

Figure 2:
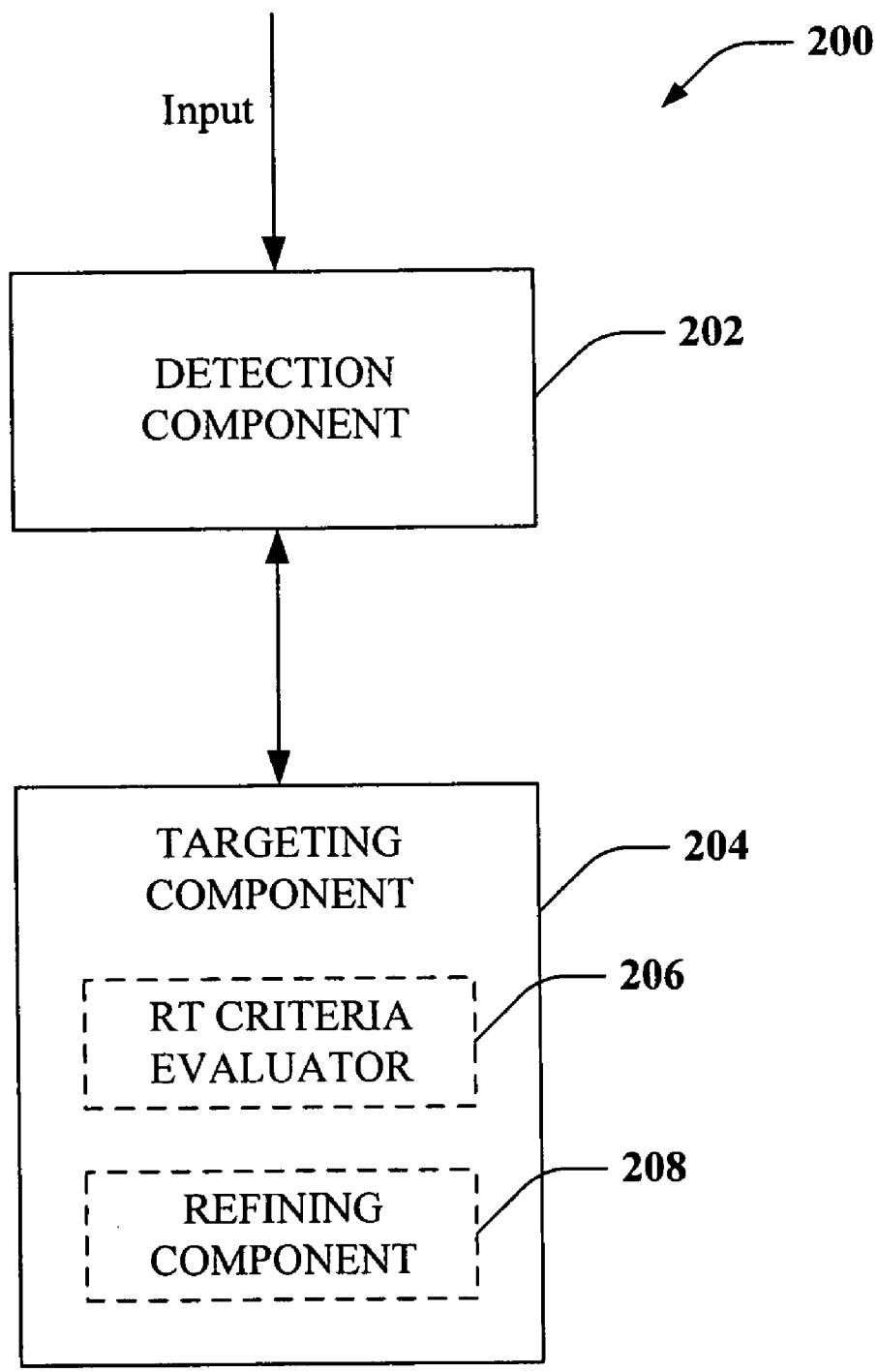
FIG. 2 illustrates a system 200 that facilitates identifying a driver package for a peripheral device via employing rich targeting criteria to isolate appropriate driver packages for installation in accordance with the invention.

FIG. 2 is an illustration of a system 200 that facilitates identifying a driver package for a peripheral device via employing rich targeting criteria to isolate appropriate driver packages for installation in accordance with the invention. The system 200 comprises a detection component 202 that determines that a new device has been connected to a computer (e.g., PC, laptop, PDA, . . . ) and receives information associated with the identity of the hardware device. The detection component 202 can compile a list of driver packages having compatible and/or matching hardware IDs to that of the newly detected peripheral device. A targeting component 204 is operatively coupled to the detection component 202, and comprises a rich targeting (RT) criteria evaluator 206 and a refining component 208. The RT criteria evaluator 206 can determine whether RT criteria are specified for a specific driver package in the list (e.g., criteria expressed in an INF associated with the driver package). If RT criteria are specified, a query can be initiated to determine whether such criteria are met. If such query returns a true result, then the refining component 208 can retain the driver package in the list of candidates, while a false condition can cause the refining component 208 to excise the driver package from the list of candidates.

In this manner, the system 200 can facilitate identifying a driver package based not only on the identity of the detected hardware device, but also based on other information such as computer manufacturer, BIOS running on the computer, number of processors in the computer (e.g., single-proc vs. multi-proc machines, . . . ), specific device information in a case where more than one device model have the same plug-and play ID, a specific language employed in a user interface (e.g., English, French, German, . . . ), etc. For instance, if ABC manufacturer desires to prevent a specific driver from being installed on its computers (e.g., due to stability issues, detected glitches, . . . ), a negative criteria (e.g., "not ABC-type") can be expressed in an INF associated with the undesirable driver package to ensure that the driver package is excised from a candidate list by the refining component 208 when a query from the targeting component 204 yields an "ABC=true" condition.

Figure 3:
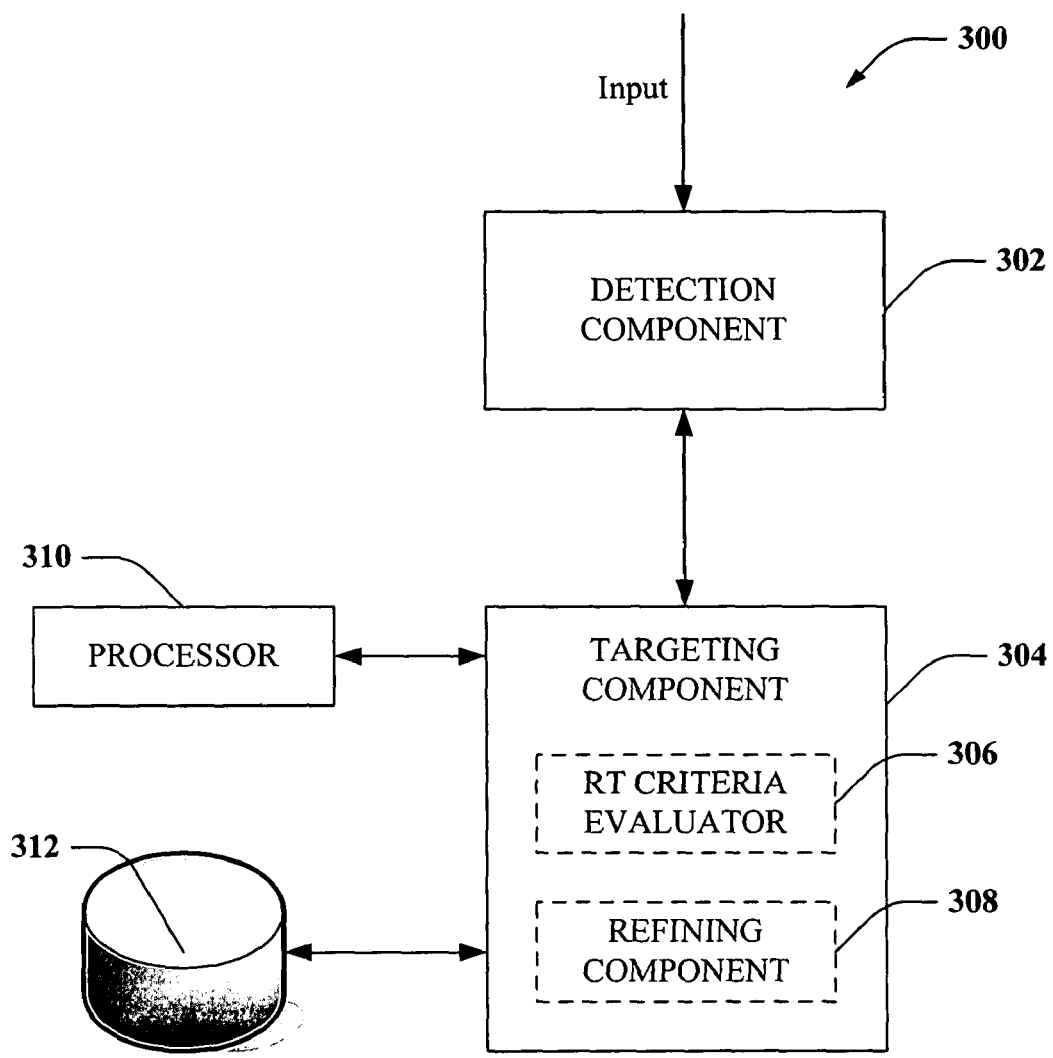
FIG. 3 illustrates a system 300 that facilitates refining driver package candidate selection and installation via rich targeting criteria evaluation in accordance with an aspect of the subject invention.

FIG. 3 illustrates a system 300 that facilitates refining driver package candidate selection and installation via rich targeting criteria evaluation in accordance with an aspect of the subject invention. The system 300 comprises a detection component 302 operatively connected to a targeting component 304. As detailed above with regard to FIG. 2, the targeting component 304 comprises an RT criteria evaluation component 306 that determines whether RT criteria are present and analyzes extant RT criteria (e.g., queries WBEM-based objects to determine whether specific conditions are true, . . . ) to assess whether such criteria are met, and a refining component 208 that excises driver packages that do not meet all RT criteria from a list of potential candidates for installation and retains driver packages that satisfy RT requirements in a refined list of potential driver packages for a detected device.

Additionally, the system 300 comprises a processor 310 that facilitates device detection, driver package identification, RT criteria evaluation, and driver package list refinement, and a memory component 312 that stores information associated with system operation (e.g., driver package candidate lists, refined driver package lists, hardware IDs, computer ID information, . . . ). It is to be appreciated that the processor 310 can be a processor dedicated to analyzing information received by the targeting component 304, a processor that controls one or more components of the system 300, and/or a process that both analyzes information received by the targeting component 304 and controls one or more components of the system 300.

The memory 312 can additionally store protocols associated with querying WBEM-based objects on a machine (e.g., computer, . . . ) to glean information related thereto for comparison with RT criteria to determine a suitable driver package, identification information related to a host computer and/or a plurality of peripheral devices, etc., and/or any other suitable information related to providing a robust driver package selection system in accordance with aspect of the subject invention. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory of the present systems and methods is intended to comprise, without being limited to, these and any other suitable types of memory.

Figure 4:
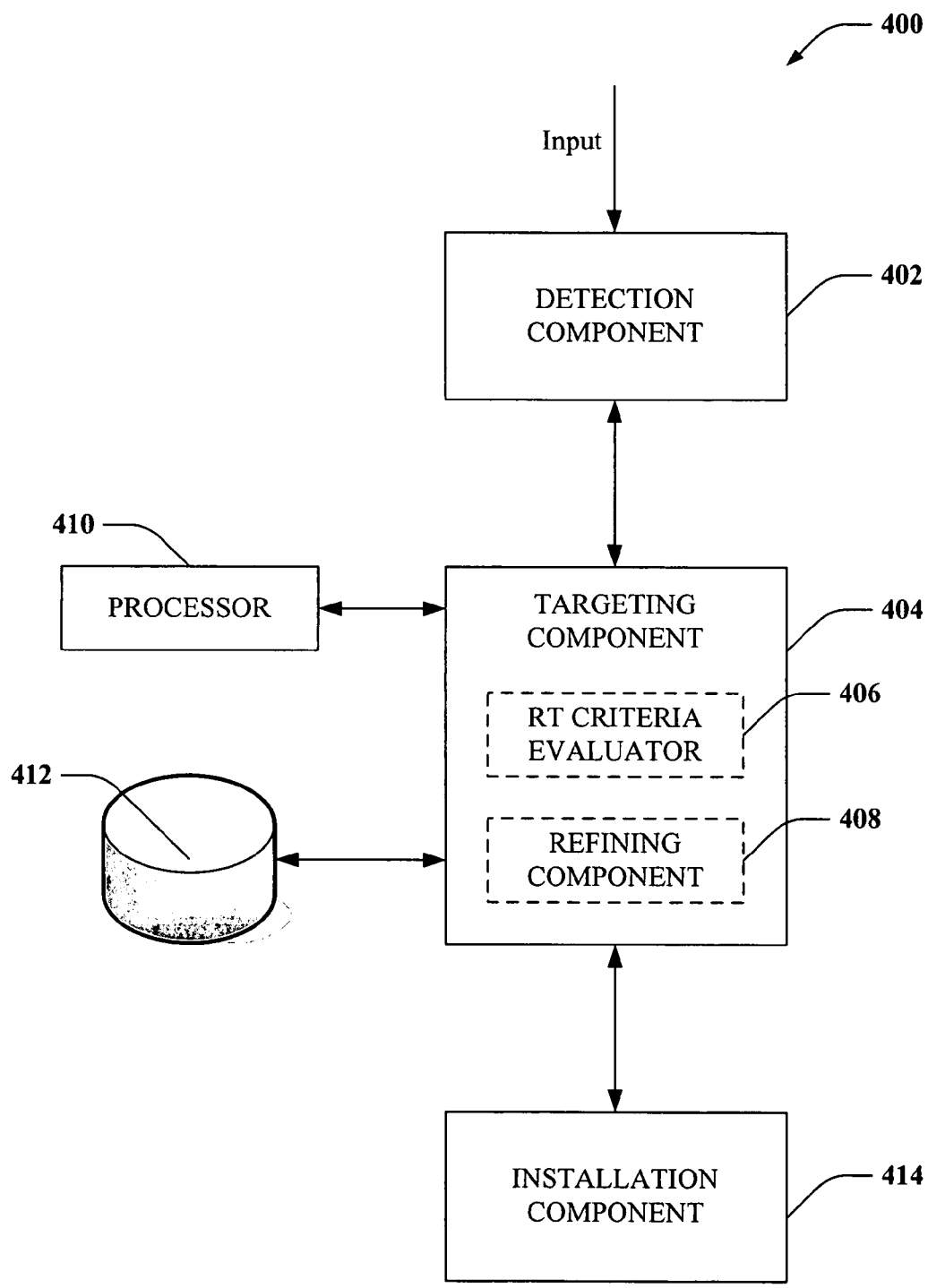
FIG. 4 illustrates a system 400 that facilitates driver package selection based on RT criteria evaluation, and installation of a best-fit driver package based on RT criteria satisfaction, in accordance with an aspect of the subject invention.

FIG. 4 is an illustration of a system 400 that facilitates driver package selection based on RT criteria evaluation, and installation of a best-fit driver package based on RT criteria satisfaction, in accordance with an aspect of the subject invention. The system 400 comprises a detection component 402 that detects a peripheral device and receives information related to the identity of the device, and a targeting component 404 that is operatively coupled to the detection component 402. The targeting component 404 comprises an evaluation component 406 that assesses RT criteria related to one or more driver packages (e.g., reads an INF associated with a driver package and determines whether the RT criteria is present, initiates an SQL query to determine whether RT criteria are met, . . . ), and a refining component 408 that reduces a list of potential candidate driver packages based an information received from the evaluation component 406. The targeting component is further operatively coupled to a processor 410 and a memory component 412, as detailed above with respect to FIG. 3.

The system 400 further comprises an installation component 414 that receives information from the targeting component 404 regarding a specific driver package selected for installation based at least in part on analysis performed by the evaluation component 406 and candidate approval by the refining component 408. For example, a series of queries can be performed in response to RT criteria detected in INF files associated with driver package candidates. For instance, the system 400, via the refining component 408 can reduce a potential driver package list to a few driver packages (e.g., 3, 10, . . . ), all of which meet all RT criteria. A determination can be made regarding which of the remaining driver packages is a best fit for the specific computer, system, etc., on which the driver package is to be installed. The installation component 414 can install the selected driver package in accordance with standard driver installation protocols.

Figure 5:
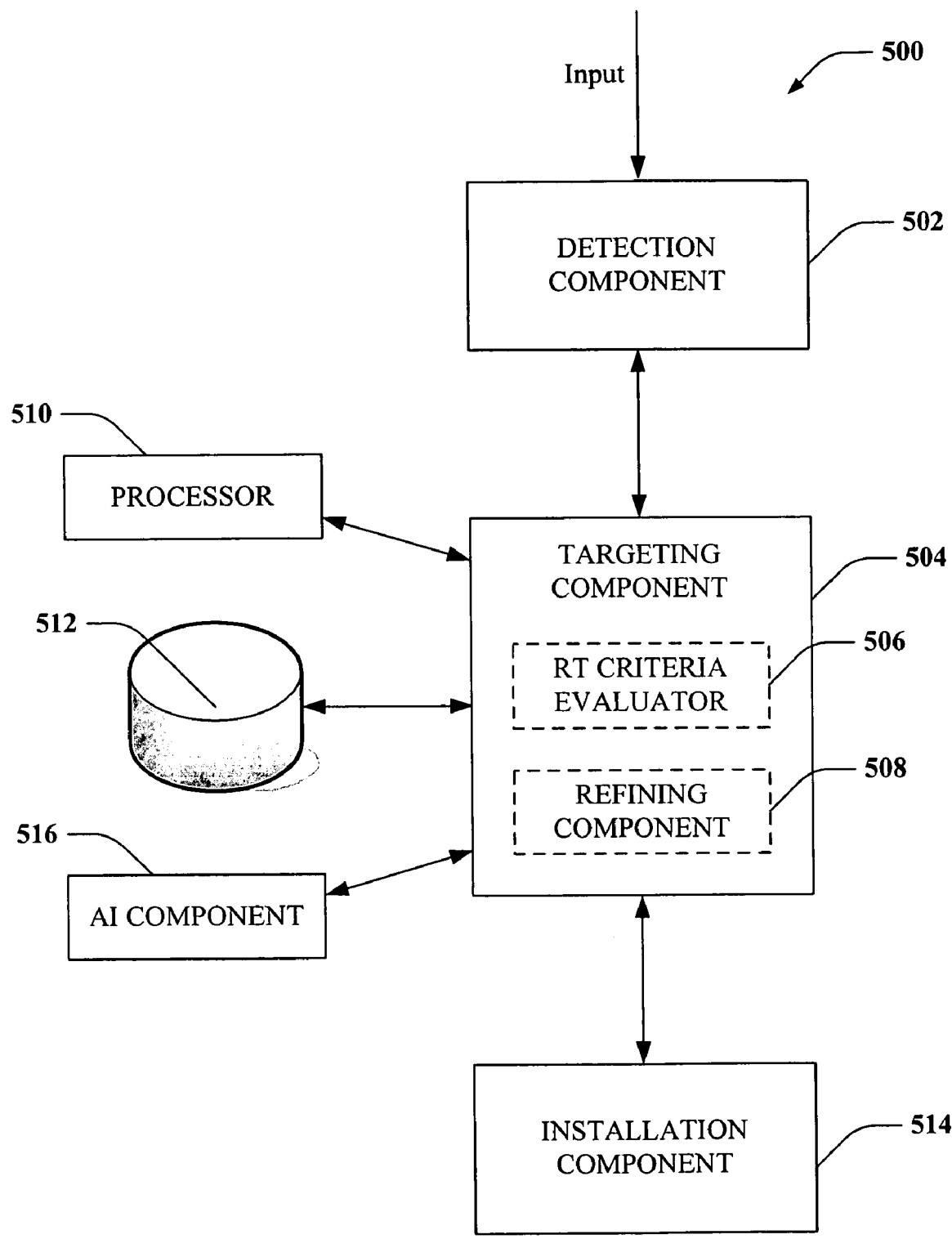
FIG. 5 illustrates a system 500 that facilitates selecting and installing a driver package for a peripheral device based on robust identification criteria in accordance with an aspect of the subject invention.

Now turning to FIG. 5, as used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, etc.) can be employed in connection with performing automatic and/or inferred action in connection with the subject invention.

FIG. 5 illustrates a system 500 that facilitates selecting and installing a driver package for a peripheral device based on robust identification criteria in accordance with an aspect of the subject invention. The system 500 comprises a detection component 502 and a targeting component 504 having an RT criteria evaluation component 506 and a refining component 508 as described above with respect to FIG. 4. The system 500 further comprises a processor 510, a memory component 512, and an installation component 514, as described with regard to FIGS. 3 and 4, all of which are operatively coupled to the targeting component 504. Additionally, the system 500 comprises an AI component 516 that makes inferences regarding driver package selection and/or installation based at least in part on information received from the targeting component 504, the processor 510, the memory component 512, and/or the detection component 502.

For example, the AI component 516 can infer an appropriate best-fit driver package from a refined list of approved driver packages (e.g., driver packages meeting all RT criteria) for installation on a host computer. Such inferences can be based, at least in part, on information related to user desires, manufacturer specifications (e.g., as expressed in a driver package, an INF file therein, . . . ), and the like. Thus, the subject invention (e.g., in connection with driver package selection and/or installation) can employ various AI-based schemes for carrying out various aspects driver package candidate selection and installation. For example, a process for determining whether a driver package meets RT criteria can be facilitated via an automatic classifier system and process. Moreover, when multiple driver packages are determined to meet all RT requirements, the classifier can be employed to determine which specific driver package is most suited to the particular combination of peripheral hardware and the machine to which the hardware is connected.

A classifier is a function that maps an input attribute vector, $x=(x1, x2, x3, x4, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a user desires to be automatically performed. In the case of driver packages, for example, attributes can be RT criteria, WBEM objects, or other data-specific attributes derived from an INF file, computer ID information, etc., and the classes are categories or areas of interest (e.g., machine specifications, RT expressions in INF files, . . . ).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria regarding whether hardware IDs are compatible, whether RT criteria are present, satisfied, etc.

While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

Figure 6:
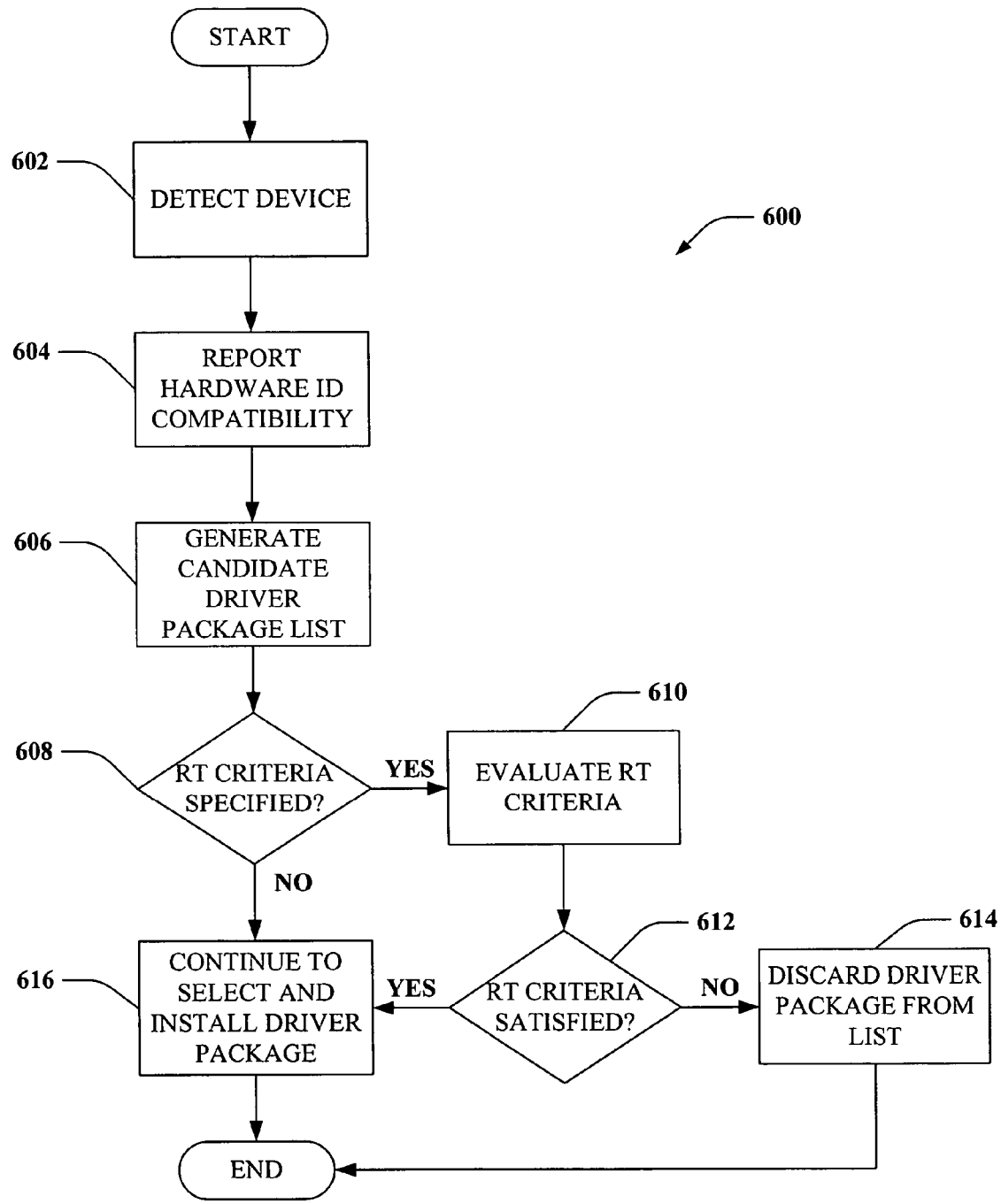
FIG. 6 illustrates a methodology 600 for fine-tuning device driver package selection for a detected peripheral hardware device connected to a computer based on robust RT criteria evaluation in accordance with an aspect of the invention.

FIG. 6 illustrates a methodology 600 for fine-tuning device driver package selection for a detected peripheral hardware device connected to a computer based on robust RT criteria evaluation in accordance with an aspect of the invention. At

602, a newly connected peripheral device (e.g., a PCMCIA card, a digital voice recorder, a digital camera, portable data storage device, . . . ) can be detected. At 604, the hardware IDs for the device can be determined (e.g., ID information can be gleaned via a bus connection between the device and a computer to which the device is connected, . . . ), and matched with driver packages on the computer hard drive, a CD, a driver update website, etc., can be assessed to generate a list of candidate driver packages based on matches between the hardware IDs and IDs listed in INFs for the driver packages detected in one or more driver packages. The list can be considered (e.g., individual driver packages can be read, assessed, . . . ) at 606.

At 608, a determination can be made regarding whether RT criteria are specified with regard to a specific driver package in the candidate list. Such RT criteria can comprise, for example: a requirement that the driver package be installed only on specific types of computers (e.g., ABC manufacturer's machines, XYZ manufacturer's machines, . . . ); that the driver package only be installed on machines running certain specific BIOS (e.g., in a case where a manufacturer has fixed a glitch in a driver to work around a problem in a particular BIOS on one of their machine models and wants to target the new driver package only to machines running the particular BIOS, . . . ); a requirement that the driver package only be installed on single-processor machines, multi-processor machines, etc.; a requirement that the driver package not be installed on a specific machine-type (e.g., in a case where a manufacturer has information that a driver for a subcomponent used in its machines is problematic, . . . ); a requirement that the driver package only be installed on machines on which a specific other driver has been previously installed (e.g., in a case where a manufacturer has updated a driver for one of two modern models, both of which models have the same hardware ID, and desires to target the updated driver package to only those machines on which the problematic driver was installed, . . . ); and the like.

If the determination at 608 indicates that no RT criteria have been specified, the method 600 can proceed to 616, where a driver package can be selected and installed according to normal protocols. If, however, the determination at 608 indicates that RT criteria is expressed in an INF associated with the driver package, then at 610 the RT criteria can be evaluated. Evaluation of the criteria can comprise, for example, initiating an SQL query to test on or more WBEM-type objects in the machine in which the driver package is a candidate for installation. At 612 a determination can be made regarding whether the RT criteria has been satisfied. If so, then the method 600 can proceed to 616 where driver package installation can proceed. If the RT criterion has not been satisfied, then at 614 the driver package can be excised from the list of driver package candidates. For example, ABC manufacturer may desire to target a driver update to its machines to the exclusion of machines not manufactured by ABC. Such can be expressed in an INF file associated with the driver package, which will trigger a query to be initiated. Rich targeting is based on SQL for WBEM-based systems. A driver package can specify RT criteria in the [Version] section of the INF file.

Example:
[Version]
AppliesWhen=[rich-targeting-criteria]

The AppliesWhen directive includes a variation of a SQL for a WBEM query expression that embodies the selection criteria for installing the driver package (in the case of the Version section). Any query expression that returns a non-empty result evaluates to true. This directive is inclusive, meaning the package will be installed if and only if the query expression evaluates to true. The following example is offered for illustrative purposes:

[Version]
. . .
AppliesWhen=From xxx_ComputerSystem where Manufacturer='ABC'

The formatting for the RT expression in the INF file required to trigger the above query can be, for example:
FROM <object> WHERE <condition>
where <object> is a WBEM object, and <condition> is an expression based on fields exposed from the object. Any suitable construct for a valid WBEM-based SQL statement can be employed. However, WBEM-based SQL statements typically permit a query on one object at a time. To circumvent this limitation, the subject systems and methods permit vendors to create more complex expressions (e.g., where the manufacture is "ABC" and a BIOS date, pulled from another WBEM-based object, has a certain date range). Thus, RT expressions can be built up or combined into a single master RT expression. They can be combined with a plurality of operators (e.g., parentheses, AND, OR, and NOT, where AND has a higher precedence than OR, . . . ). For example: "(Rich Target Expression) AND (Rich Target Expression)." When building complex Rich Target Expressions, each sub expression can be contained in parenthesis to delineate the WBEM-based expressions and indicate operator position. The following example illustrates a more complex target expression.

AppliesWhen=((From xxx_ComputerSystem where Manufacturer='ABC') and (From xxx_Bios where ReleaseDate>'6/18/2002')) or (from xxx_SystemDriver where Pathname="xxx")

The above requires that either the computer be manufactured by ABC AND the BIOS running thereon be a version released after Jun. 18, 2000, OR that the specific system driver be detected on the machine before the candidate driver package can be installed thereon. According to another example, in a case where more than one condition needs to be met by a single object, then it must all be contained within a single RT sub-expression. For example, the two expressions below are not equivalent:

(From xxx_LogicalDisk DeviceId='C:') and (From xxx_LogicalDisk FreeSpace>1000000000)
(From xxx_LogicalDisk DeviceId='C:' and FreeSpace>1000000000)

The first expression is TRUE if there is a drive 'C:' on the system, and there is a drive (whether 'C' or any other drive) with at least 1000000000 bytes free. The second expression says that drive 'C:' must have 1000000000 bytes free. In either case, if such conditions return all true results after query, then the driver package candidate can be installed on the machine.

Figure 7:
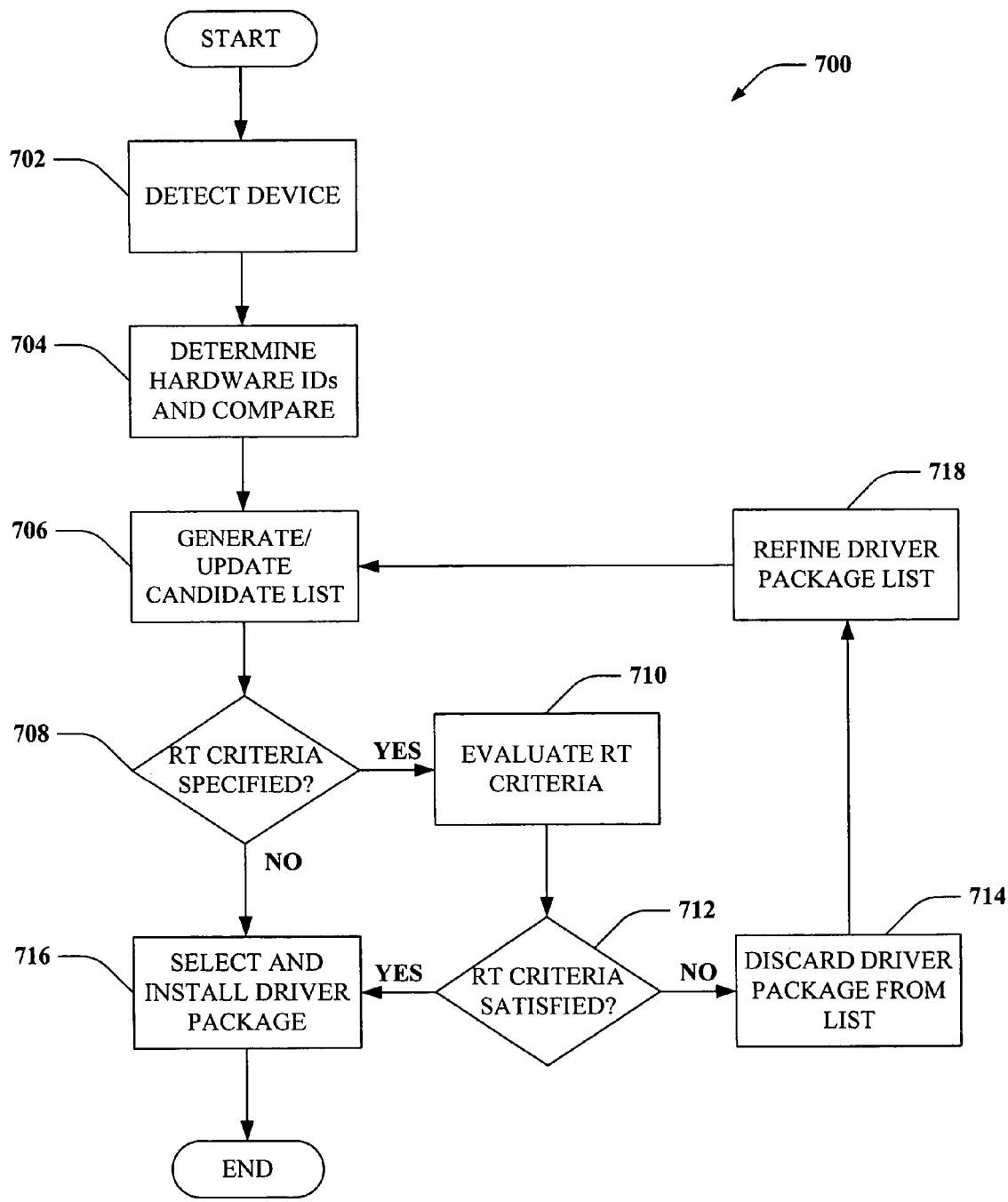
FIG. 7 illustrates a methodology 700 for refining a driver package candidate list based on robust selection criteria beyond simple hardware identity matching criteria via an iterative feedback loop.

FIG. 7 illustrates a methodology 700 for refining a driver package candidate list based on robust selection criteria beyond simple hardware identity matching criteria via an iterative feedback loop. At 702, a peripheral device such as a plug-and-play device can be detected. At 704, the hardware ID for the device can be determined and hardware IDs associated with driver packages on the computer hard drive, a CD, a driver update website, etc., can be assessed and matched to create a list of candidate driver packages. The list can be considered (e.g., individual driver packages can be read, assessed, . . . ) at 706. At 708, a determination can be made regarding whether RT criteria are specified with regard to a specific driver package in the candidate list.

If at 708 it is determined that no RT criteria have been specified by a vendor, the method 700 can proceed to 716, where a driver package can be selected and installed according to normal protocols. If, however, the determination at 708 indicates that RT criteria is expressed (e.g., in a "version" section of an INF associated with the driver package), then at 710 the RT criteria can be evaluated. Evaluation of the criteria can comprise, for example, initiating an SQL query to test one or more WBEM-based objects in the machine or computer in which the driver package is a candidate for installation. Then, at 712, a determination can be made regarding whether specified RT criteria have been satisfied. If RT criteria are satisfied (e.g., the query returns TRUE results), then at 716 driver package installation can proceed. If the RT criterion has not been satisfied, then at 714 the driver package can be excised from the list of driver package candidates.

In order to pore through the potentially thousands of driver packages stored in a computer hard drive, and/or the tens-of-thousands of driver packages typically residing on a driver update website, the method 700 provides for an iterative process by which, for example, list refinement can occur at 718. For instance, each time a driver package is determined to fail to satisfy RT criteria, the package can be deleted from the list and the list can be refined and/or updated accordingly at 718. After list refinement, the method 700 can revert to 706 for a new iteration of listed driver package candidate consideration (e.g., a next driver package candidate in the list can be assessed for RT criteria, . . . ).

Figure 8:
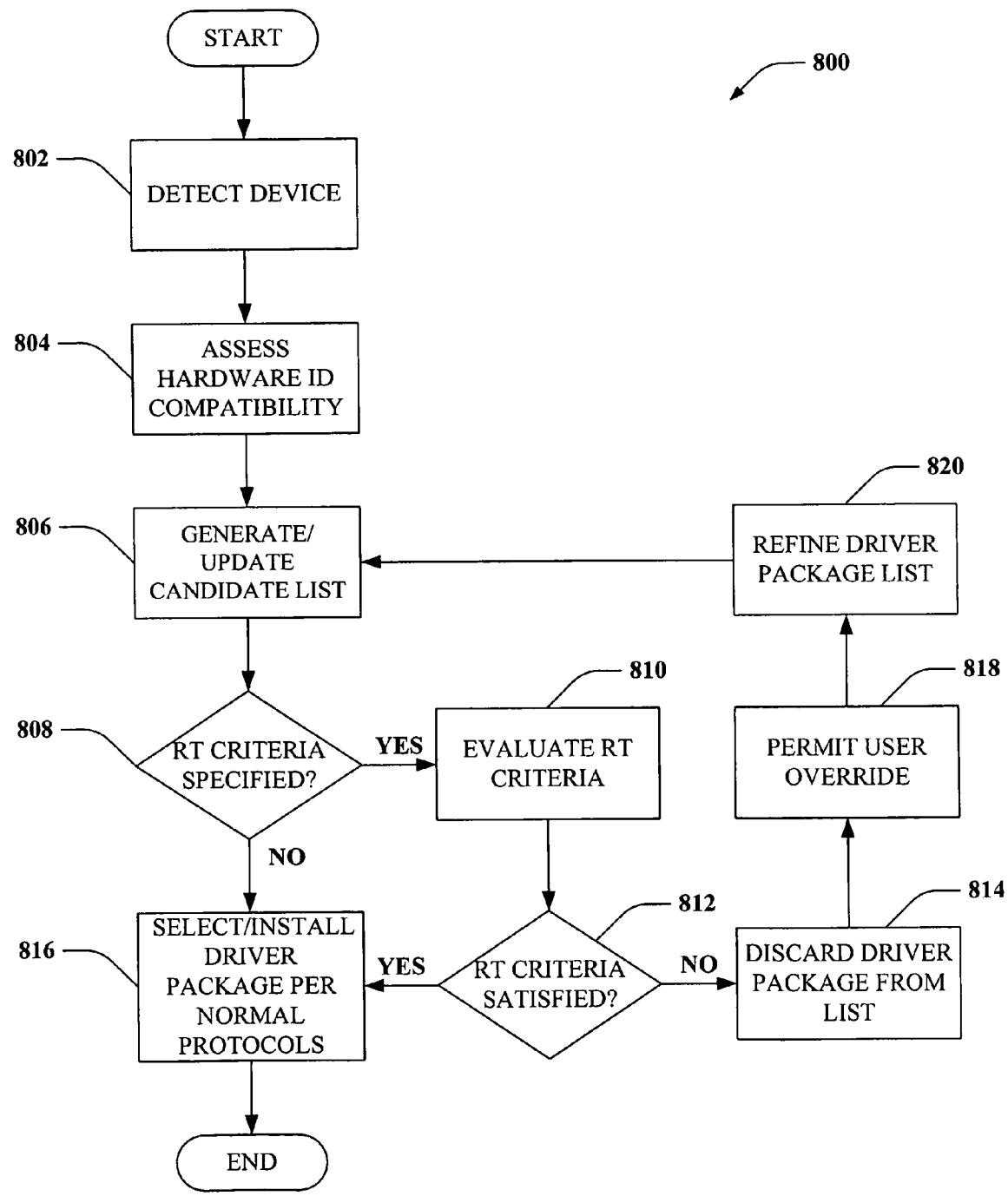
FIG. 8 illustrates a methodology 800 for selecting a best-fit driver package candidate based on selection criteria beyond simple hardware identity matching criteria while providing user override capability.

FIG. 8 illustrates a methodology 800 for selecting a best-fit driver package candidate based on selection criteria beyond simple hardware identity matching criteria while providing user override capability. At 802, a peripheral device can be detected. At 804, a the device can be identified via a hardware ID associated therewith, and hardware IDs associated with driver packages on the computer hard drive, a CD, a driver update website, etc., can be assessed and matched to create a list of candidate driver packages. The list can be considered (e.g., individual driver packages can be read, assessed, . . . ) at 806. At 808, a determination can be made regarding whether RT criteria are specified with regard to each specific driver package in the candidate list.

If the determination at 808 indicates that driver packages under consideration is devoid of RT criteria, the method 800 can proceed to 816, where a driver package can be selected and installed according to normal protocols. If, however, the determination at 808 indicates that RT criteria are present (e.g., in an INF associated with the driver package), then at 810 such RT criteria can be evaluated. Evaluation of the criteria can comprise, for example, initiating a query to test one or more objects in the machine or computer in which the driver package is to be installed. At 812, a determination can be made as to whether all specified RT criteria have been met. If RT criteria are satisfied, then the method 800 can proceed to 816 for driver package installation. If the RT criteria have not been satisfied, then the method 800 can proceed to 814 where the driver package can be removed from the list of driver package candidates.

A user can desire to install a particular driver package despite the fact that the driver package does not meet all RT criteria. For example, a user to install a driver package that matches a hardware ID for a connected peripheral device and that matches specified RT computer manufacturer ID, but fails to match, for instance, specified RT criteria related to monitor manufacturer and/or presentation quality capability. If such is the case, the user can override driver package deletion and retain the driver package as a candidate for installation at 818. Additionally and/or alternatively, user override can allow the user to select the driver package for immediate installation. If the driver package is so devoid of RT criteria satisfaction that installation thereof can be considered detrimental to computer function, system stability, etc., then a pop-up or other suitable warning can be presented to the user indicating that installation of the driver package can be harmful to the computer. To further this example, a pop-up warning can indicate a degree of severity of the warning (e.g., via color-coding, an icon such as a skull-and-crossbones, . . . ).

According to a related aspect of the example, a user can be presented with a pop-up window via which the user can select to approve various actions related to the methodology 800. Upon selecting such an option, the user can be prompted to approve or override a particular action prior to action initiation so that the user can be aware of each action taking place and can customize driver package selection and/or installation according to specific needs.

Figure 9:
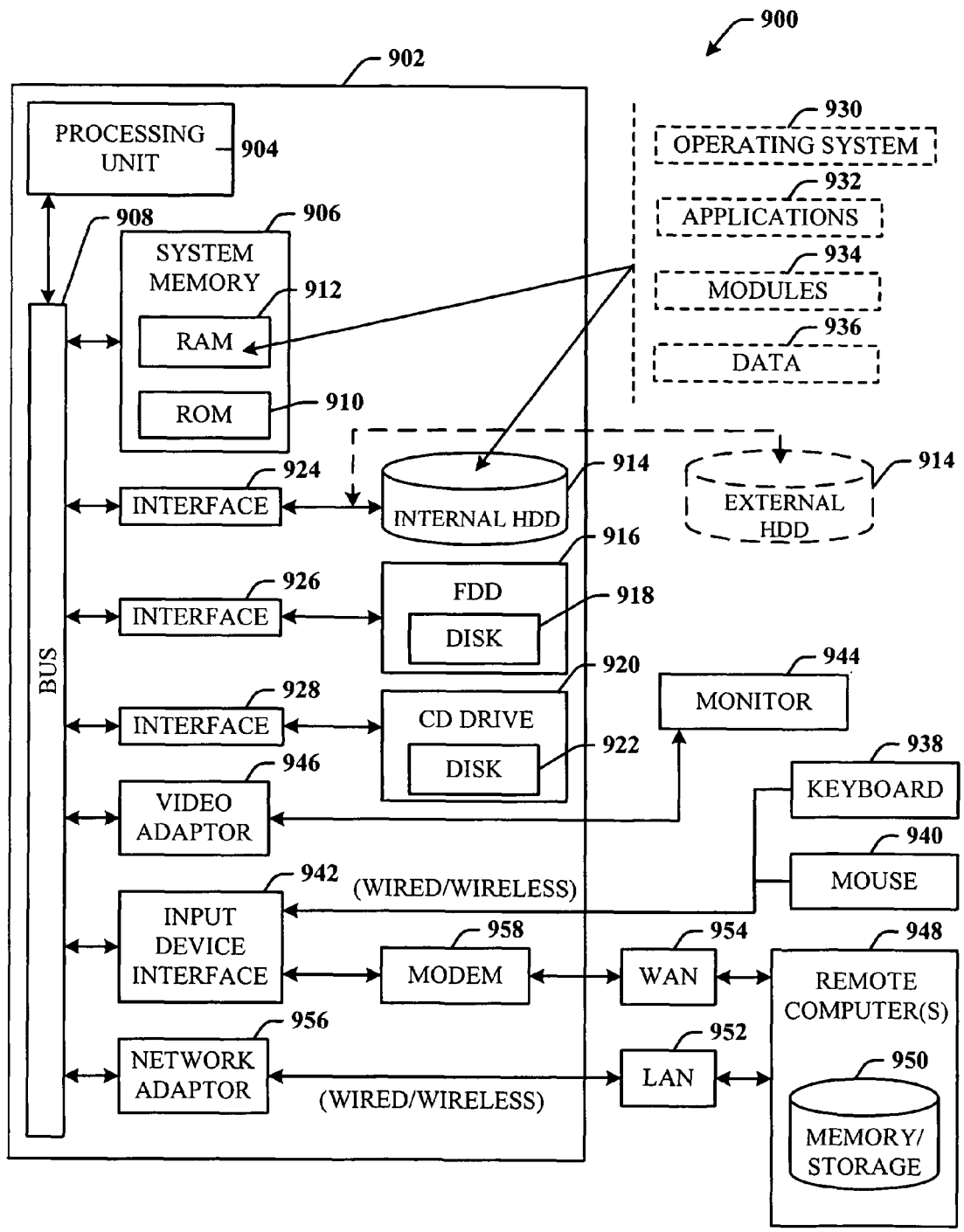
FIG. 9 illustrates a block diagram of a computer 900 operable to execute the disclosed architecture.

Referring now to FIG. 9, there is illustrated a block diagram of a computer operable to execute the disclosed architecture. In order to provide additional context for various aspects of the present invention, FIG. 9 and the following discussion are intended to provide a brief, general description of a suitable computing environment 900 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 9, there is illustrated an exemplary environment 900 for implementing various aspects of the invention includes a computer 902, the computer 902 including a processing unit 904, a system memory 906 and a system bus 908. The system bus 908 couples system components including, but not limited to, the system memory 906 to the processing unit 904. The processing unit 904 may be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up.

The computer 902 further includes a hard disk drive 914, a magnetic disk drive 916, (e.g., to read from or write to a removable disk 918) and an optical disk drive 920, (e.g., reading a CD-ROM disk 922 or to read from or write to other high capacity optical media such as Digital Video Disk (DVD)). The hard disk drive 914, magnetic disk drive 916 and optical disk drive 920 can be connected to the system bus 908 by a hard disk drive interface 924, a magnetic disk drive interface 926 and an optical drive interface 928, respectively. The drives and their associated computer-readable media provide nonvolatile storage of data, data structures, computer-executable instructions, and so forth. For the computer 902, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 912, including an operating system 930, one or more application programs 932, other program modules 934 and program data 936. It is appreciated that the present invention can be implemented with various commercially available operating systems or combinations of operating systems.

A user can enter commands and information into the computer 902 through a keyboard 938 and a pointing device, such as a mouse 940. Other input devices (not shown) may include a microphone, an IR remote control, a joystick, a game pad, a satellite dish, a scanner, or the like. These and other input devices are often connected to the processing unit 904 through a serial port interface 942 that is coupled to the system bus 908, but may be connected by other interfaces, such as a parallel port, a game port, a universal serial bus ("USB"), an IR interface, etc. A monitor 944 or other type of display device is also connected to the system bus 908 via an interface, such as a video adapter 946. In addition to the monitor 944, a computer typically includes other peripheral output devices (not shown), such as speakers, printers etc.

The computer 902 may operate in a networked environment using logical connections via wired and/or wireless communications to one or more remote computers, such as a remote computer(s) 948. The remote computer(s) 948 may be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include a local area network (LAN) 952 and a wide area network (WAN) 954. Such networking environments are commonplace in offices, enterprise-wide computer networks, intranets and the Internet.

When used in a LAN networking environment, the computer 902 is connected to the local network 952 through a wired or wireless communication network interface or adapter 956. The adaptor 956 may facilitate wired or wireless communication to the LAN 952, which may also include a wireless access point disposed thereon for communicating with the wireless adaptor 956. When used in a WAN networking environment, the computer 902 typically includes a modem 958, or is connected to a communications server on the LAN, or has other means for establishing communications over the WAN 954, such as the Internet. The modem 958, which may be internal or external and a wired or wireless device, is connected to the system bus 908 via the serial port interface 942. In a networked environment, program modules depicted relative to the computer 902, or portions thereof, may be stored in the remote memory storage device 950. It will be appreciated that the network connections shown are exemplary and other means of establishing a communications link between the computers may be used.

The computer 902 is operable to communicate with any wireless devices or entities operably disposed in wireless communication, e.g., a printer, scanner, desktop and/or portable computer, portable data assistant, any piece of equipment or location associated with a wirelessly detectable tag (e.g., a kiosk, news stand, restroom), and telephone. This includes at least Wi-Fi and Bluetooth™ wireless technologies. Thus the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

The disclosed computer 902 may also be employed with HiperLAN technology. HiperLAN is a set of wireless local area network (WLAN) communication standards primarily used in European countries. There are two specifications: HiperLAN/1 and HiperLAN/2, both of which have been adopted by the European Telecommunications Standards Institute. The HiperLAN standards provide features and capabilities similar to those of the IEEE 802.11 WLAN standards used in the U.S. and other adopting countries. HiperLAN/I provides communications at up to 20 Mbps in the 5-GHz range of the radio frequency spectrum. HiperLAN/2 operates at up to 54 Mbps in the same RF band, and is compatible with 3G (third-generation) WLAN systems for sending and receiving data, images, and voice communications. HiperLAN/2 has the potential, and is intended, for implementation worldwide in conjunction with similar systems in the 5-GHz RF band.

Figure 10:
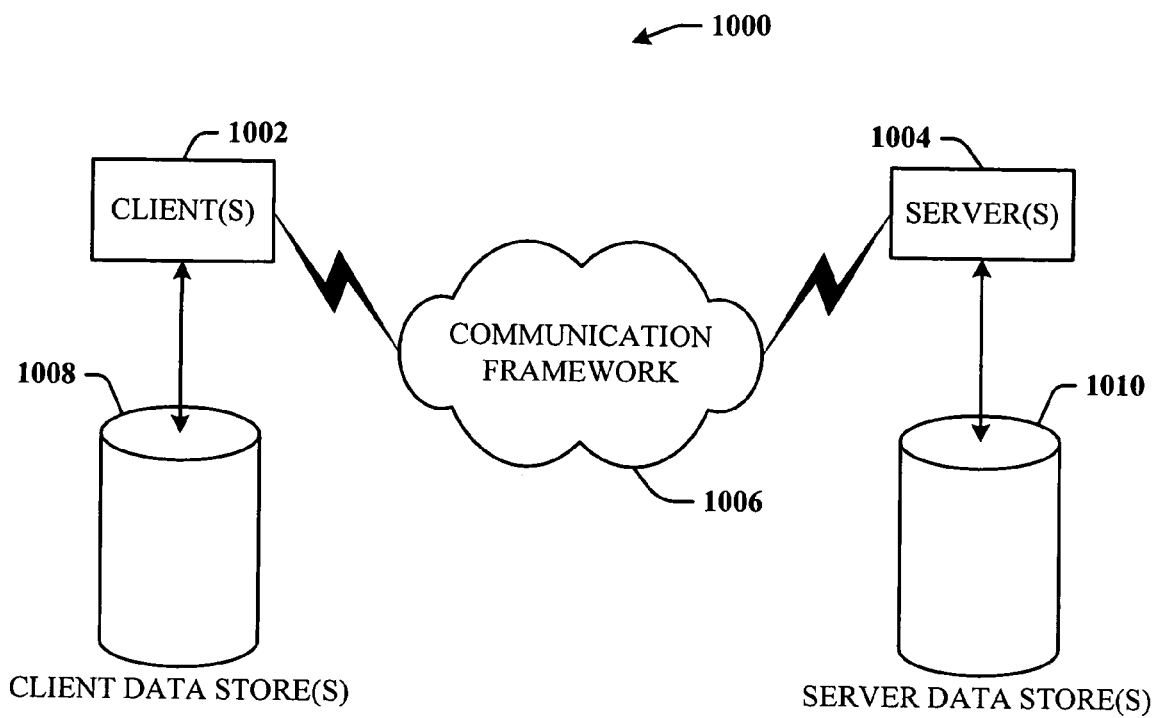
FIG. 10 illustrates a schematic block diagram of an exemplary computing environment 1000 in accordance with the subject invention.

Referring now to FIG. 10, there is illustrated a schematic block diagram of an exemplary computing environment 1000 in accordance with the present invention. The system 1000 includes one or more client(s) 1002. The client(s) 1002 can be hardware and/or software (e.g., threads, processes, computing devices). The client(s) 1002 can house cookie(s) and/or associated contextual information by employing the present invention, for example. The system 1000 also includes one or more server(s) 1004. The server(s) 1004 can also be hardware and/or software (e.g., threads, processes, computing devices). The servers 1004 can house threads to perform transformations by employing the present invention, for example. One possible communication between a client 1002 and a server 1004 may be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications may be facilitated via a wired (including optical fiber) and/or wireless technology. The client(s) 1002 are operably connected to one or more client data store(s) 1008 that can be employed to store information local to the client(s) 1002 (e.g., cookie(s) and/or associated contextual information). Similarly, the server(s) 1004 are operably connected to one or more server data store(s) 1010 that can be employed to store information local to the servers 1004.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for selecting a driver package for use on a computer, the system comprising:
    at least one processor executing:
        a detection component that detects presence of a device and compiles a list of driver packages that are compatible with the detected device, the driver packages including vendor-specific criteria as one or more targeting expressions in information files associated with the driver packages;
        a targeting component that evaluates respective criteria associated with each driver package in the list to facilitate refined selection of a driver package from the list, wherein the criteria specify conditions that must be met in order to qualify the associated driver package as eligible for installation on a computer, and wherein the criteria include vendor-specific criteria and conditions relating to properties of the computer on which the device is to be installed, the properties including at least the BIOS running on the computer.

2. The system of claim 1, wherein the detection component detects a plug-in event of the device.

3. The system of claim 1, further comprising an installation component that installs a selected driver package when the criteria associated with the driver package are satisfied.

4. The system of claim 1, wherein the criteria associated with a driver package further comprise the number of processors running in the computer.

5. The system of claim 1, wherein the criteria associated with a driver package further comprise information related to at least one of a manufacturer of the computer on which the driver package is to be installed or a model of the computer.

6. A computer-implemented method for refining a candidate driver package list for a peripheral plug-in device to be installed on a computer, the method comprising: with at least one processor:
    detecting a peripheral plug-in device;
    generating a list of compatible driver packages for the peripheral plug-in device that includes a first driver package, said first driver package including vendor-specific criteria as one or more targeting expressions in an information file associated with the first driver package;
    assessing the vendor-specific criteria associated with the first driver package, the vendor-specific criteria specifying conditions relating to properties of a computer that must be satisfied in order to qualify the first driver package for installation on the computer, the properties including at least the BIOS running on the computer;
    determining whether the vendor-specific criteria has been satisfied; and deleting the first driver package from the candidate driver package list when the vendor-specific criteria is not satisfied.

7. The method of claim 6, further comprising expressing a negative criteria in the information file that prevents the first driver package from being installed on a computer when the negative criteria returns a "true" result when evaluated against the computer.

8. The method of claim 7, determining whether the vendor-specific criteria has been satisfied comprises querying one or more objects on the computer defined by the targeting expression.

9. The method of claim 8, wherein the object is a web-based enterprise management formatted object.

10. The method of claim 8, wherein the vendor-specific criteria are satisfied when the query returns a "true" result.

11. The method of claim 8, wherein the driver package is excised from the driver package candidate list when the query returns a "false" result.

12. The method of claim 7, wherein the targeting expression comprises at least one of an AND, OR, or NOT operator.

13. The method of claim 6, wherein the vendor-specific criteria comprise information related to at least one of the computer's model, the computer's manufacturer, or an operating system running on the computer.

14. The method of claim 6, further comprising retaining the first driver package in the candidate driver package list when the vendor specific criteria are satisfied.

15. The method of claim 6, further comprising permitting a user to override an action related to candidate driver package list refinement.

16. The method of claim 6, further comprising installing the first driver package on the computer to run the device when the computer satisfies the vendor-specific criteria.

17. A computer-readable medium having stored thereon computer executable instructions for carrying out the method of claim 6.

18. A system that facilitates selecting a driver package for a detected peripheral device, the system comprising:
    means for detecting a peripheral device upon connection of the device to a computer;
    means for determining a hardware ID for the detected device and comparing the hardware ID to hardware IDs in a driver package in the computer to generate a list of candidate driver packages;
    means for evaluating additional criteria associated with each candidate driver package to refine the candidate driver package list, the additional criteria comprising vendor-specific criteria associated with the driver package and one or more query expressions that query properties of the computer, wherein a candidate driver package is removed from the list when the associated expression returns a "false" result; and means for overriding the removal of a candidate driver package whose associated expression has returned a "false" result and retaining the candidate driver package as a candidate for installation.

19. The system of claim 18, wherein the means for evaluating additional criteria comprises means for querying objects identified by the additional criteria to determine whether the additional criteria are satisfied, the objects associated with properties of the computer on which the driver is to be installed.

20. The system of claim 18, further comprising means for selecting a driver package candidate that satisfies the additional criteria and installing the selected driver package candidate.

* * * * *